United States Patent [19]

Capelle

[11] Patent Number: 4,781,563
[45] Date of Patent: Nov. 1, 1988

[54] FILTER CHANGING MECHANISM INCLUDING MEANS FOR DISCHARGING RESIDUES OF RUBBER OR THERMOPLASTICS MATERIAL FROM EXTRUSION PRESSES

[75] Inventor: Gerd Capelle, Langenhagen, Fed. Rep. of Germany

[73] Assignee: Hermann Berstorff Maschinenbau GmbH, Hannover, Fed. Rep. of Germany

[21] Appl. No.: 71,475

[22] Filed: Jul. 9, 1987

[30] Foreign Application Priority Data

Jul. 16, 1986 [DE] Fed. Rep. of Germany ....... 3623935

[51] Int. Cl.⁴ .............................................. B29C 47/68
[52] U.S. Cl. .................... 425/185; 210/236; 210/447; 425/197; 425/199; 425/225
[58] Field of Search ............... 210/390, 391, 407, 413, 210/447, 236; 264/36, 39, 238, 349; 425/188, 190, 197, 198, 199, 185, 218, 225, 226, 227, 229, 376 R, 472

[56] References Cited

U.S. PATENT DOCUMENTS

| | | | |
|---|---|---|---|
| 3,653,419 | 4/1972 | Schutter | 425/183 |
| 4,334,847 | 6/1982 | Schauffele | 425/227 |
| 4,468,322 | 8/1984 | Fogarty, Jr. et al. | 210/447 |
| 4,507,072 | 3/1985 | Gaul, Jr. | 210/447 |
| 4,619,600 | 10/1986 | Gneuss | 425/197 |

FOREIGN PATENT DOCUMENTS 1554789  1/1970  Fed. Rep. of Germany ...... 425/225

*Primary Examiner*—Jay H. Woo
*Assistant Examiner*—C. Scott Bushey
*Attorney, Agent, or Firm*—Foley & Lardner, Schwartz, Jeffery, Schwaab, Mack, Blumenthal & Evans

[57] ABSTRACT

A filter changing apparatus for use in an extrusion press, comprising a frame, filter support members hydraulically displaceable in the frame, in a direction which is substantially at right angles to the flow of material through the press and filters disposed in each of the filter support members, at least one of the filter support members being detachably mounted in the frame, and a support member for discharging residues of rubber or thermoplastics material from the extrusion press, the support member being detachably mountable in the frame in place of the at least one detachably mounted filter support member, the support member having associated therewith a discharge plate for displacing residual material in the extrusion press to a discharge station.

2 Claims, 1 Drawing Sheet

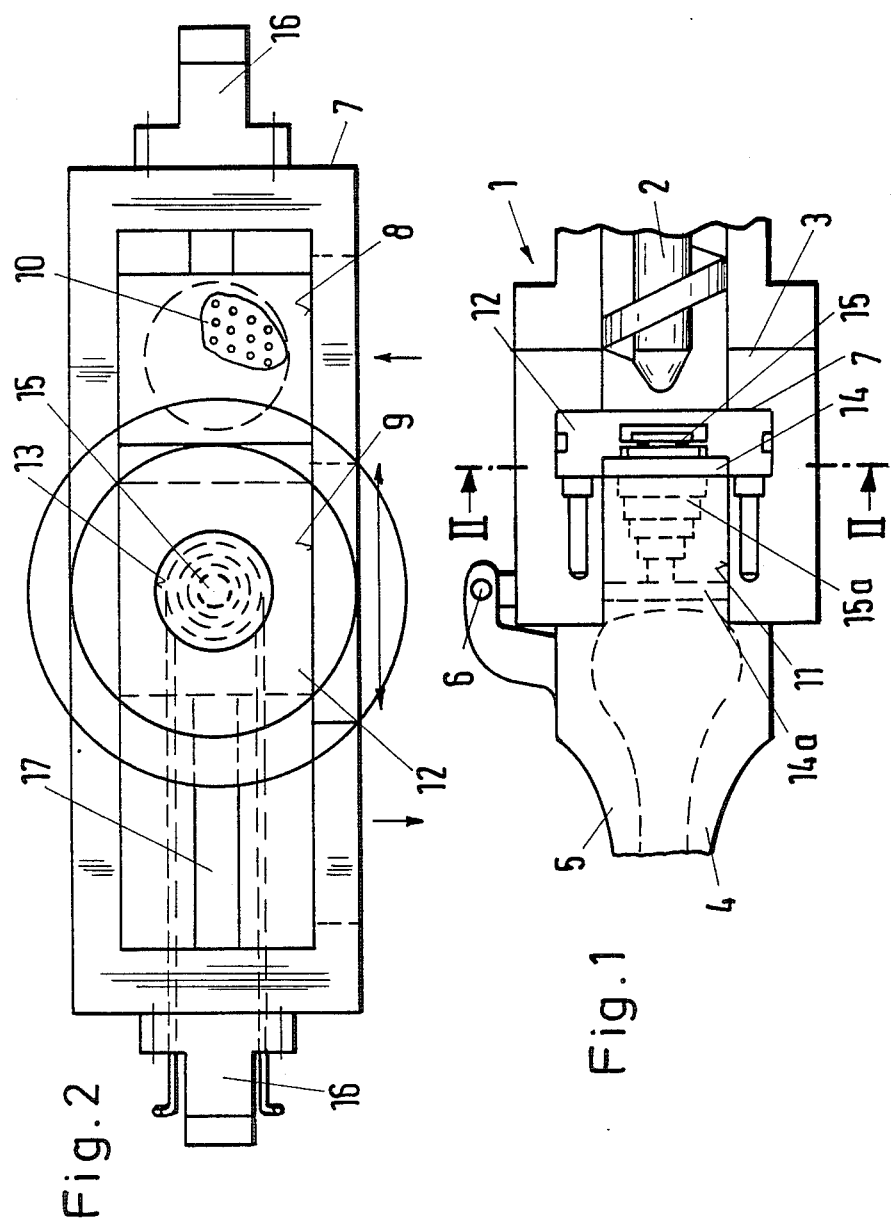

FILTER CHANGING MECHANISM INCLUDING MEANS FOR DISCHARGING RESIDUES OF RUBBER OR THERMOPLASTICS MATERIAL FROM EXTRUSION PRESSES

FIELD OF THE INVENTION

The present invention relates to a filter changing device for use in extrusion presses. More particularly, the present invention relates to a device which includes means for discharging rubber or thermoplastics material residues from the extrusion press.

BACKGROUND OF THE INVENTION AND PRIOR ART DISCUSSION

It is both extremely time-consuming and difficult to remove residues of material from the flow channel of an extrusion press when the mixture in the press is to be changed or when a production run has been completed. It is usually necessary to detach and extract each scrap of material remaining in the flow channel by hand or by using tools. This is very time-consuming and it will be apparent that, in any production process which necessitates several changes of mixture, the process is interrupted for long periods of time. Moreover, when the material residues are removed using tools, the extremely smooth walls of the flow channels often become scored. This necessitates the extensive regrinding of the walls of the flow channel.

U.S. Pat. Spec. No. 3,653,419 discloses a filter changing means which includes a frame which is disposed at right angles to the direction of flow of the material. The frame accommodates two sets of filters and is displaceable so that, at any given time, one set of filters is disposed in the flow channel for filtering purposes and the other set are not in use. Changeover of the sets of filters permits a contaminated set of filters to be taken out of use for cleaning and/or replacement. However, such an arrangement does not suggest any way in which material residues can be removed from the interior of the press.

OBJECTS OF THE INVENTION

The present invention seeks to provide a filter changing device which is generally of the above-described type in that a frame defining two chambers, each of which can accommodate a set of filters, is employed but in which means are provided for discharging material residue from the flow channel of the extrusion press.

The invention also seeks to provide an apparatus in which the means for removing the residues both facilitates and substantially accelerates the removal of residues of material from the flow channels whilst minimising the risk of the wall of the flow channel being damaged.

SUMMARY OF THE INVENTION

In accordance with the present invention, there is provided a filter changing apparatus for use in an extrusion press comprising a frame, filter support members hydraulically displaceable in the frame, in a direction which is substantially at right angles to the flow of material, through the press and filters disposed in each of the filter support members, at least one of the filter support members being detachably mounted in the frame, and means for discharging residues of rubber or thermoplastics material from the extrusion press, said means comprising a support member detachably mountable in the frame in place of the at least one detachably mounted filter support member, the discharge means support member having means associated therewith for displacing residual material in the extrusion press to a discharge station.

Preferably, the means for displacing the residual material comprises a discharge plate displaceable in a direction corresponding generally to the direction of flow of material through the press by means of a telescopic hydraulically-actuated cylinder.

Desirably, the discharge plate has a cross-sectional area corresponding substantially to the cross-sectional area of the flow channel of the extrusion press into which it is insertable.

When one support member for a filter set has been removed from the appropriate receiver chamber of the filter frame and has been replaced by the support member having the residual material displacement means associated therewith, and when the discharge apparatus is displaced at right angles into the flow path through the extrusion press, the discharge apparatus is ready for operation.

The hydraulically-actuated double-acting telescopic cylinder is then extended and the discharge plate, which is mounted on the telescopic cylinder, is displaced in the direction of the nozzle outlet. The material in the flow channel is pushed, in the form of a wad, in the direction of the nozzle outlet. If the nozzle is provided with an upper portion which is pivotable upwardly away from the lower portion, it is possible for the wad to be removed easily as one piece.

Only a short period of time is required for this operational step, so a change in the mixture of material being used can be effected in a substantially shorter time than has hitherto been possible. In the case where rubber is being extruded, the rapid removal of scrap material also prevents the material from prevulcanizing on the walls of the flow channel in the heat extrusion press. If such prevulcanization did occur, the residual material would be even more difficult to remove.

BRIEF DESCRIPTION OF THE DRAWINGS

One embodiment of an apparatus in accordance with the invention will be further described, by way of example, with reference to the accompanying drawings, in which:

FIG. 1 is a longitudinal sectional view through a portion of an extrusion press incorporating a filter changing apparatus in accordance with the present invention; and FIG. 2 is a cross-sectional view taken along the line II—II of FIG. 1.

DESCRIPTION OF PREFERRED EMBODIMENT

In the drawings, there is shown a screw press 1 in which a conveyor screw 2 rotates. An extrusion head 3 is flange-mounted on the press 1, the head being provided with a wide-slotted nozzle 4. In order to permit the interior of the nozzle 4 to be cleaned, it includes an upper portion 5 which is adapted to pivot about a pivot axis 6.

A frame 7 is disposed in the head 3 at right angles to the direction of flow of the material through the head 3. Within the frame 7, two receiver chambers 8 and 9 are defined. Sets of filters 10, which are disposed in holders 12, are reciprocatingly displaceable in the chambers 8 and 9. Thus, for example, the left-hand (as shown in FIGS. 2) set of filters may be disposed in the path of the material flowing through the flow channel 11 of the extrusion press. When this set of filters has reached a particular degree of contamination, the adjacent set of filters in chamber 8 is displaced into the path of the material by means of an hydraulic cylinder 16. The new set of filters remains in the operative position and the contaminated set of filters may be cleaned or replaced. When a further changeover is required, this is effected by a simple displacement of the support member by means of the hydraulic cylinders 16, so that the new or cleaned set of filters is disposed in the flow path 11. Such filter changing means are known.

However, the present invention additionally provides a discharge apparatus which is insertable into one of the receiver chambers, such as the chamber 9, instead of a new set of filters. Such insertion is possible when the support member 12 is in its position denoted by 17, that is to say, when the chamber 9 is not in the flow path of the material.

The discharge apparatus comprises a support member 12 which is provided with a circular recess 13 for receiving a discharge plate 14.

The discharge plate 14 is displaceable away from and towards the support member 12 axially along the flow channel 11 by means of a double-acting telescopic hydraulic cylinder 15, so that the plate and cylinder occupy the positions 14a and 15a respectively shown in FIG. 1 in broken lines.

The method of operation of the device will now be described. It will be assumed that the chamber 8, including a set of filters 10, is located in the flow channel 11. The set of filters 10 in the chamber 9 is therefore not in use and is replaced by the discharge apparatus. At this time, the hydraulic cylinder 15 is in its retracted state so that the discharge plate 14 is located in the recess 13 and lies flush with the surface of the support member 12. By utilizing a hydraulic cylinder 16, the chamber 9 is displaced into the flow channel 11. The hydraulic cylinder 15 is then actuated so that the plate 14 and the cylinder 15 are moved into the positions 14a and 15a shown in FIG. 1. This causes material in the flow channel to be compressed and pushed into the nozzle 4. The upper portion 5 of this latter is then pivoted upwardly and the wad of material is removed therefrom. The portion 5 is thereafter pivoted back into its original position and the hydraulic cylinder 15 re-actuated so that the plate 14 and cylinder 15 return to their original positions in which the plate 14 lies flush with the surface of the support member 12. The support plate 12 is then displaced into position 17 by means of the hydraulic cylinders 16 so that the support member 12, including the discharge apparatus 14, 15, can be removed from the frame 7. The discharge apparatus can now be removed and replaced by a second set of filters 10.

I claim:

1. A filter changing apparatus for use in an extrusion press having a discharge station and a flow channel through which the extruded material passes in a flow direction to said discharge station, comprising:
   (a) a frame,
   (b) a pair of filter support members disposed in said frame, with at least one of said support members being detachably mounted in said frame,
   (c) filter means adapted to be disposed in each support member in a position generally perpendicular to the direction of material flow,
   (d) first hydraulic means for displacing said filter support members in a direction which is substantially at right angles to the direction of material flow, and
   (e) means for discharging residual material in said flow channel to said discharge station, including a separate support member detachably mounted in said frame and replacing said at least one support member, a telescopic hydraulic cylinder mounted in said separate support member and adapted to telescopically move in a direction parallel to the flow direction of said material, and a discharge plate mounted on said telescopic hydraulic cylinder, actuation of said hydraulic cylinder functioning to move said discharge plate and displace residual material in said flow channel to said discharge station for removal therethrough.

2. A filter changing apparatus as recited in claim 1, wherein said discharge plate has a cross-sectional area corresponding substantially to the cross-sectional area of said flow channel so as to clear the same of residual material.

* * * * *